United States Patent
Neto et al.

(10) Patent No.: US 11,590,571 B2
(45) Date of Patent: Feb. 28, 2023

(54) METHOD FOR PRODUCING A SINTERED COMPONENT

(71) Applicant: Miba Sinter Austria GmbH, Laakirchen (AT)

(72) Inventors: Jose Correa Neto, Campinas (BR); Robert Hellein, Ungenach (AT); Daniel Napoleao Rodrigues, Indaiatuba (BR)

(73) Assignee: Miba Sinter Austria GmbH, Laakirchen (AT)

( * ) Notice: Subject to any disclaimer, the term of this patent is extended or adjusted under 35 U.S.C. 154(b) by 29 days.

(21) Appl. No.: 17/060,271

(22) Filed: Oct. 1, 2020

(65) Prior Publication Data

US 2021/0121958 A1    Apr. 29, 2021

(30) Foreign Application Priority Data

Oct. 25, 2019   (AT) .................................. 50188/2019

(51) Int. Cl.
| | |
|---|---|
| *B22F 3/16* | (2006.01) |
| *C22C 38/16* | (2006.01) |
| *C22C 38/12* | (2006.01) |
| *C22C 38/08* | (2006.01) |
| *C22C 38/04* | (2006.01) |
| *B22F 3/24* | (2006.01) |
| *C21D 1/06* | (2006.01) |
| *C23C 8/22* | (2006.01) |

(52) U.S. Cl.
CPC .................. *B22F 3/16* (2013.01); *B22F 3/24* (2013.01); *C22C 38/04* (2013.01); *C22C 38/08* (2013.01); *C22C 38/12* (2013.01); *C22C 38/16* (2013.01); *B22F 2003/248* (2013.01); *B22F 2301/35* (2013.01); *C21D 1/06* (2013.01); *C23C 8/22* (2013.01)

(58) Field of Classification Search
None
See application file for complete search history.

(56) References Cited

U.S. PATENT DOCUMENTS

| | | |
|---|---|---|
| 2,192,792 A | 3/1940 | Kurtz |
| 3,837,848 A | 9/1974 | Wessel |
| 4,314,399 A | 2/1982 | Severinsson |
| 4,470,953 A | 9/1984 | Bruce |
| 2002/0048526 A1 * | 4/2002 | Nakamura .......... C22C 33/0264 419/57 |
| 2003/0221516 A1 | 12/2003 | Alcini |

FOREIGN PATENT DOCUMENTS

| | | |
|---|---|---|
| DE | 2 032 814 A1 | 5/1972 |
| DE | 27 02 602 A1 | 8/1977 |
| DE | 10 2010 052 066 A1 | 5/2012 |
| JP | H10-130701 A | 5/1998 |
| RU | 2 271 896 C2 | 6/2005 |

OTHER PUBLICATIONS

Davis, Joseph R. Surface Hardening of Steels: Understanding the Basics, ASM International, Materials Park, OH, 2002, pp. 137-138. (Year: 2002).*

* cited by examiner

*Primary Examiner* — Anthony M Liang
(74) *Attorney, Agent, or Firm* — Collard & Roe, P.C.

(57) ABSTRACT

The invention relates to a method for producing a sintered component comprising the steps: providing a metallic powder; filling the powder into a powder press; pressing the powder to form a green compact; removing the green compact from the powder press; sintering the green compact into a sintered component with pores; optional redensification of the sintered component; hardening of the sintered component, wherein the pores of the sintered component, prior to hardening at least in that region of the surface of the sintered component which is subjected to a hardening, are at least partially filled with a filling agent.

7 Claims, No Drawings

METHOD FOR PRODUCING A SINTERED COMPONENT

CROSS REFERENCE TO RELATED APPLICATIONS

Applicant claims priority under 35 U.S.C. § 119 of Austrian Application No. GM 50188/2019 filed on Oct. 25, 2019, the disclosure of which is incorporated by reference.

The invention relates to a method for producing a sintered component comprising the steps: providing a metallic powder; filling the powder into a powder press; pressing the powder to form a green compact; removing the green compact from the powder press; sintering the green compact into a sintered component with pores; optional redensification of the sintered component; hardening of the sintered component.

The invention further relates to a sintered component comprising a component body having a surface which is at least partially hardened.

Sintered components, i.e. components which are produced according to a powder-metallurgical method, are widely used in technology. Due to the relative ease with which components with complex structures can be produced in large quantities, they have a clear advantage over cast components. However, the porosity of the sintered components occasionally is a problem with regard to various properties of the sintered components, such as their strength. To improve the strength, it is known to harden the sintered components.

It was the object of the present invention to provide an improved method for hardening a sintered component as well as a sintered component produced in accordance therewith.

In the initially mentioned method, the object is achieved in that the pores of the sintered component, prior to hardening at least in that region of the surface of the sintered component which is subjected to a hardening, are at least partially filled with a filling agent.

The object is further achieved by the initially mentioned sintered component in which the pores in the sintered body are at least partially filled with a filling agent at least in the region of the hardened surface.

The advantage of this is that by the at least partial filling of the pores in the region of the surface to be hardened, the volume available for diffusion processes is limited. Since pores are usually subject to a pore size distribution, this results in concentration fluctuations of components that "accumulate" in larger pores. By limiting the pore volume and/or by entirely closing the pores, this can be prevented. Consequently, a sintered component can be provided which has uniform properties at least in the region to be hardened.

According to an embodiment variant of the invention, it can be provided for that the filling agent is already added to the sintering powder itself, which serves to facilitate the at least partial filling of the surface pores.

According to another embodiment variant of the invention, however, it can be provided for that the filling agent is added after sintering of the green compact. Hence, the pores in the region to be hardened can be at least partially filled in a more targeted manner. Moreover, it can thus be achieved that the sintered component during at least partial filling of the pores already has a higher strength, such that component distortions due to side reactions between the filler and metallic components of the sintering powder or with components from the ambient atmosphere can be better avoided.

According to a further embodiment of the invention, a metal or a metal alloy can be used as a filling agent. This has the advantage that hence the sintered component can be (once again) heated to a higher temperature for the at least partial filling of the pores.

In the preferred embodiment variant of the invention, an iron-based powder is used as the metallic powder, in particular, according to a further embodiment variant of the invention, an alloy containing between 0.1 wt. % and 0.9 wt. % of C, between 0 wt. % and 5.0 wt. % of Ni, between 0 wt. % and 2 wt. % of Mo, between 0 wt. % and 1 wt. % of Mn and between 0.1 wt. % and 3 wt. % of copper, the remainder being iron.

According to another embodiment variant of the invention, it can be provided for better adaption of the component properties to the procedure that an iron-based powder is used, which comprises a proportion of carbon and/or that the sintered component is case-hardened.

As described above, the sintered component is hardened. According to embodiment variants of the invention, hardening is preferably carried out by carburization and subsequent quenching or sinter hardening and subsequent quenching or inductive hardening.

According to a further embodiment variant, it can be provided that carburization is carried out by means of low-pressure carburizing or carbonitriding. This has the advantage that even with sintered components that are very narrow in the axial direction hardness profiles can be set very specifically compared to other carburizing processes. Thus, it is possible to obtain a soft core also in these sintered components.

For the purpose of better understanding of the invention, it will be elucidated in more detail by means of the description below.

First, it should be noted that the disclosures contained in the entire description may also be analogously transferred to equal parts. Moreover, the specifications of location, such as at the top, at the bottom, at the side and so on, chosen in the description, in case of a change of position, are to be analogously transferred to the new position.

In this regard, the production of the metallic sintered components is carried out according to a powder-metallurgical method (sintering method). Such methods are generally well known from the prior art such that a detailed explanation of the essentials of this method is dispensed with. In this regard, it should only be mentioned that the method essentially comprises the steps of providing a powder, filling the powder into a powder press, pressing the powder to form a green compact, removing the green compact from the powder press, single or multi-stage sintering of the green compact into a sintered component, optional redensification of the sintered component and hardening the sintered component. Therefore, merely the essential steps of the method according to the invention are elucidated in further detail below. As regards the remaining method steps, reference is made to the prior art.

The mentioned method steps are preferably executed in the indicated order. However, it is also possible that the redensification of the sintered green compact is carried out at another point of the process. Moreover, further method steps can be comprised such that the method steps listed above are not necessarily to be carried out immediately one after another although this is possible.

The sintered component can have any desired geometry, for example the shape of a gear or of a bearing cap or a bearing block or a pin, etc.

Moreover, after sintering, the sintered component has pores. According to the invention, in the context of the method it is provided that these pores are closed prior to hardening of the sintered component. For this purpose, the pores located in that region of the sintered component which is hardened are at least partially filled with a filling agent. Thus, filling the pores can affect merely a partial region of the surface or the entire surface of the sintered component.

In the invention, the pores are not simply closed by redensification but are filled at least partially, in particular entirely, with the filling agent in said region.

For example, resin can be used as the filling agent. However, as regards the applicability of diverse hardening methods for the sintering component, it is advantageous if a metal or a metal alloy is used as the filling agent. For example, tin can be used for this purpose. However, preferably copper or a copper alloy, for example a copper alloy including iron, for example including up to 5 wt. % iron, is used for at least partially closing the pores, in particular where an iron-based powder is preferably used as the metallic powder. However, other metallic powders, such as hardenable aluminum alloys etc., can also be processed by means of the method according to the invention.

It is the purpose of the use of the filling agent to reduce the volume available for region-wise enrichment of substances in the sintered component. For example, by filling the pores in the region of the surface of the sintered component, overcarburization during the hardening of sintered components made of an iron-based powder, in particular a steel powder, can be avoided and/or significantly reduced. Hence, damage occurring in consequence of too much brittleness of the sintered component can be prevented.

The filling agent can be added to the sintering powder itself. In this case, a corresponding excess of the filling agent should be added if the filling agent reacts with components of the remaining sintering powder and thus is not or just partially available for filling. Depending on the application, the exact amount to be used can be determined by means of a few tests.

In this embodiment variant of the method, the pores in the surface region are closed already during sintering by the filling agent diffusing into the pores and hence filling these.

Moreover, it is possible that the filling agent is added during sintering. For this purpose, the filling agent in solid form can be placed in the sintering furnace next to the green compact produced from the sintering powder. During sintering, the filling material also melts and can thus penetrate into the pores of the sintered component.

In multi-stage sintering methods, the filler can be added in the first and/or one of the subsequent sintering stages.

According to another embodiment variant of the method, it can be provided that the filling agent is added only during and/or after sintering of the green compact into the sintered green compact. For this purpose, the filling agent can be applied onto that region in which the pores are at least partially filled, for example as a powder or as a shaped body, for example in the form of an ingot or disc or a foil or wire, etc. Subsequently, the sintered component is again heated which causes the filling agent to melt, to penetrate into the pores and to at least partially fill these.

In general, it is advantageous for the method if a filling agent is used which has a lower melting point than the material of which the metallic powder for producing the sintered component consists. In particular, the melting point of the filling agent can be in a range that is below the melting point of the metallic powder for producing the sintered component by 800° C. to 200° C.

The pores of the sintered component can be at least partially filled with the filling material up to a depth of between 30 μm and 900 μm measured from the surface of the sintered component.

Where not the entire surface of the sintered component is treated with the filling agent, it is further advantageous if the region in which the pores are at least partially filled with the filling agent is larger than the region to be hardened, for example 10% to 30% larger than the region to be hardened. The region to be hardened is preferably entirely located within the region the pores of which have been at least partially filled.

In the context of the invention, at least partially filled means that the volume of the pores is filled with the filling agent to at least 60% and up to 100%.

According to an embodiment variant of the method, an alloy can be used which contains between 0.1 wt. % and 0.9 wt. % of C (graphite), between 0 wt. % and 5.0 wt. % of Ni, between 0 wt. % and 2 wt. % of Mo, between 0 wt. % and 1 wt. % of Mn and between 0.1 wt. % and 3 wt. % of copper, the remainder being iron. For example, as the iron-based powder an alloy is used which contains between 0.4 wt. % and 0.7 wt. % of C (graphite), between 1.5 wt. % and 2.0 wt. % of Ni, between 0.04 wt. % and 0.6 wt. % of Mo, between 0.05 wt. % and 1 wt. % of Mn and between 1.3 wt. % and 1.7 wt. % of copper, the remainder being iron. However, an alloy containing between 0.6 wt. % and 0.8 wt. % of C and between 1.1 wt. % and 2.5 wt. % of copper and optionally between 1.5 wt. % and 2.5 wt. % of nickel can also be used for the iron-based powder. The quantitative proportions of the alloy elements refer to the iron-based powder per se and not to the mixture with the optionally used additives.

In case of the use of an iron-based powder as the metallic powder for producing the sintered component and the hardening by carburization, it can in general be provided that an iron-based powder is used which already comprises a proportion of carbon and/or that the sintered component is case-hardened.

In general, any suitable hardening process known from the prior art can be applied for hardening the sintered component. According to a preferred embodiment variant of the method, however, hardening is carried out by carburization and subsequent quenching or by sinter hardening and subsequent quenching or by inductive hardening.

In the embodiment variant of the method according to which the sintered component is hardened by carburization and subsequent quenching, the stop of carburization can be carried out simultaneously with a second sintering step if sintering is carried out in two stages.

By the carburization, the carbon content in the sintered component is increased. The carburization can generally be carried out by means of different methods; preferably, a gas or a gas mixture is used as the carbon source. As the gas for example methane, propane, acetylene, etc. can be used. The carburization can also be carried out by carbonitriding.

However, the carburization can also be carried out in another known carburization method.

By the carburization, the carbon content of the sintered component can be increased by 0.1 wt. % to 1.0 wt. %.

In particular, the carburization can be carried out up to a depth of the sintered component, as measured starting from its surface, which is selected from a range of 100 μm to 2000 μm; preferably from a range of 100 μm to 1000 μm. In this respect, the preferred carbon content mentioned above refers to this carburization depth. Lower regions of the sintered component 2 can accordingly have a lower carbon content.

Quenching can be carried out using any suitable method known from the prior art, for example by means of oil quenching. However, quenching of the sintered component is preferably carried out using a gas, for example using N2, N2/H2 or He. The quenching speed can be selected from a range of 1° C./s to 7° C./s.

To evaluate the method, a shift finger of a car transmission was produced according to it. For this purpose, D10 was used as a sintering powder (2 wt. % Cu, 0.75 wt. % C, remainder Fe). The sintering powder was processed in the method steps pressing, sintering with addition of filling agent, subsequent carbonitriding (gas carburization) with subsequent quenching (oil or gas). It became apparent that hardening the sintered component resulted in more uniform properties of the sintered component.

The exemplary embodiments describe possible embodiment variants, while it should be noted at this point that combinations of the individual embodiment variants are also possible.

The invention claimed is:

1. A method for producing a sintered component comprising the steps:
   providing an iron-based powder consisting of between 0.1 wt. % and 0.9 wt. % of C, between 0 wt. % and 5.0 wt. % of Ni, between 0 wt. % and 2 wt. % of Mo, between 0 wt. % and 1 wt. % of Mn and between 0.1 wt. % and 3 wt. % of copper, the remainder being iron;
   filling the powder into a powder press;
   pressing the powder to form a green compact;
   removing the green compact from the powder press;
   sintering the green compact into a sintered component with pores;
   optionally redensifying the sintered component;
   hardening of the sintered component;
   wherein the pores of the sintered component, prior to hardening at least in a region of a surface of the sintered component which is subjected to hardening, are at least partially filled with a filling agent.

2. A method for producing a sintered component, comprising the steps:
   adding a filling agent to an iron-based powder consisting of between 0.1 wt. % and 0.9 wt. % of C, between 0 wt. % and 5.0 wt. % of Ni, between 0 wt. % and 2 wt. % of Mo, between 0 wt. % and 1 wt. % of Mn and between 0.1 wt. % and 3 wt. % of copper, the remainder being iron;
   filling the powder into a powder press;
   pressing the powder to form a green compact;
   removing the green compact from the powder press;
   sintering the green compact into a sintered component with pores;
   optionally redensifying the sintered component;
   hardening of the sintered component;
   wherein the pores of the sintered component, prior to hardening at least in a region of a surface of the sintered component which is subjected to hardening, are at least partially filled with the filling agent.

3. The method according to claim 1, wherein the filling agent is added during and/or after sintering of the green compact.

4. The method according to claim 1, wherein a metal or a metal alloy is used as the filling agent.

5. The method according to claim 1, wherein the sintered component is case-hardened.

6. The method according to claim 1, wherein the hardening is carried out by carburization and subsequent quenching or by sinter hardening and subsequent quenching or by inductive hardening.

7. The method according to claim 6, wherein the carburization is carried out by means of low-pressure carburizing or carbonitriding.

* * * * *